US010825241B2

(12) United States Patent
Sipko et al.

(10) Patent No.: US 10,825,241 B2
(45) Date of Patent: Nov. 3, 2020

(54) USING A ONE-DIMENSIONAL RAY SENSOR TO MAP AN ENVIRONMENT

(71) Applicant: Microsoft Technology Licensing, LLC, Redmond, WA (US)

(72) Inventors: Jeffrey Sipko, Kirkland, WA (US); Kendall Clark York, Bellevue, WA (US); John Benjamin Hesketh, Kirkland, WA (US); Kenneth Liam Kiemele, Redmond, WA (US); Bryant Daniel Hawthorne, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/924,025

(22) Filed: Mar. 16, 2018

(65) Prior Publication Data

US 2019/0287296 A1     Sep. 19, 2019

(51) Int. Cl.
*G06T 17/05* (2011.01)
*G01S 7/481* (2006.01)
(Continued)

(52) U.S. Cl.
CPC ............ *G06T 17/05* (2013.01); *G01S 7/4817* (2013.01); *G01S 17/10* (2013.01); *G01S 17/89* (2013.01); *G06T 2210/04* (2013.01)

(58) Field of Classification Search
None
See application file for complete search history.

(56) References Cited

U.S. PATENT DOCUMENTS

| 6,646,725 | B1 * | 11/2003 | Eichinger ................. G01P 5/26 |
| | | | 356/28 |
| 8,818,124 | B1 * | 8/2014 | Kia .......................... G01S 17/89 |
| | | | 250/208.1 |

(Continued)

FOREIGN PATENT DOCUMENTS

| WO | 2016041088 A1 | 3/2016 |
| WO | 2017151778 A1 | 9/2017 |

OTHER PUBLICATIONS

"International Search Report and Written Opinion Issued in PCT Application No. PCT/US19/021511", dated Jun. 21, 2019, 12 Pages.

(Continued)

*Primary Examiner* — Andrew G Yang
(74) *Attorney, Agent, or Firm* — Mark K. Young; Mayer & Williams, PC

(57) ABSTRACT

A wearable device is configured with a one-dimensional depth sensor (e.g., a LIDAR system) that scans a physical environment, in which the wearable device and depth sensor generate a point cloud structure using scanned points of the physical environment to develop blueprints for a negative space of the environment. The negative space includes permanent structures (e.g., walls and floors), in which the blueprints distinguish permanent structures from temporary objects. The depth sensor is affixed in a static position on the wearable device and passively scans a room according to the gaze direction of the user. Over a period of days, weeks, months, or years the blueprint continues to supplement the point cloud structure and update points therein. Thus, as the user continues to navigate the physical environment, over time, the point cloud data structure develops an accurate blueprint of the environment.

18 Claims, 18 Drawing Sheets

(51) Int. Cl.
*G01S 17/89* (2020.01)
*G01S 17/10* (2020.01)

(56) References Cited

U.S. PATENT DOCUMENTS

| | | | |
|---|---|---|---|
| 9,317,133 B2 | 4/2016 | Korah et al. | |
| 9,753,950 B2* | 9/2017 | Schultz | G06Q 50/16 |
| 2004/0230552 A1* | 11/2004 | Smith | G06F 16/2322 |
| 2009/0323121 A1* | 12/2009 | Valkenburg | G01B 11/002 |
| | | | 358/1.18 |
| 2010/0172598 A1* | 7/2010 | Kimura | G06T 5/006 |
| | | | 382/296 |
| 2013/0120736 A1 | 5/2013 | Bosse et al. | |
| 2014/0145914 A1* | 5/2014 | Latta | G06F 1/3215 |
| | | | 345/8 |
| 2014/0301633 A1* | 10/2014 | Furukawa | G06T 17/00 |
| | | | 382/154 |
| 2015/0362587 A1 | 12/2015 | Rogan et al. | |
| 2016/0005229 A1 | 1/2016 | Lee et al. | |
| 2016/0063332 A1 | 3/2016 | Sisbot et al. | |
| 2016/0210785 A1 | 7/2016 | Balachandreswaran et al. | |
| 2016/0291134 A1 | 10/2016 | Droz et al. | |
| 2017/0124396 A1* | 5/2017 | Todeschini | G06K 9/00671 |
| 2017/0256096 A1* | 9/2017 | Faaborg | G06T 19/20 |
| 2017/0300973 A1 | 10/2017 | Jones et al. | |
| 2018/0188043 A1* | 7/2018 | Chen | G06T 7/11 |
| 2018/0190017 A1* | 7/2018 | Mendez | G06T 19/006 |
| 2018/0259966 A1* | 9/2018 | Long | G08G 1/00 |
| 2018/0316901 A1* | 11/2018 | Carrier | H04N 5/232 |

OTHER PUBLICATIONS

Bosse, et al. "Continuous 3D Scan-Matching with a Spinning 2D Laser", In Proceedings of The 2009 IEEE International Conference on Robotics and Automation, May 12, 2009, 8 Pages.

* cited by examiner

800

Initial blueprint

Actual layout

900

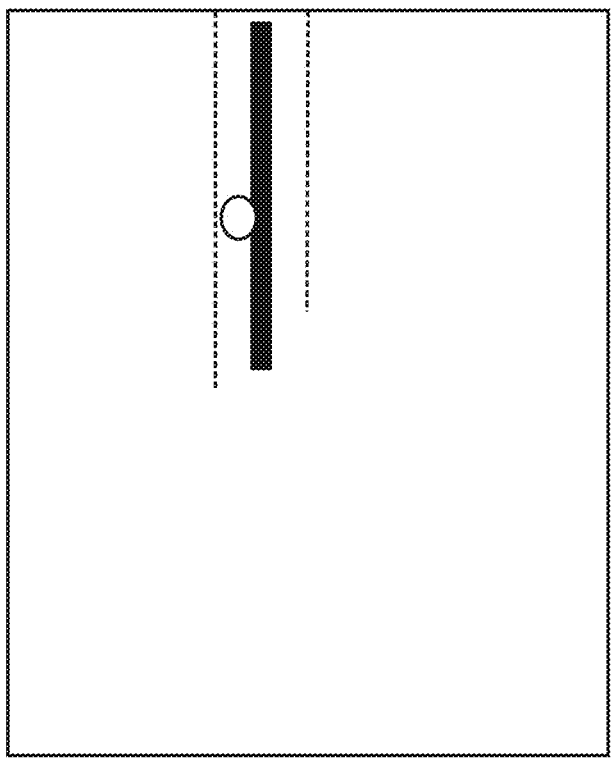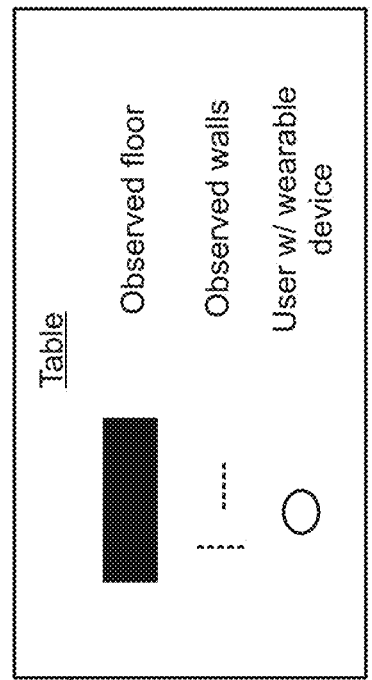
FIG 11

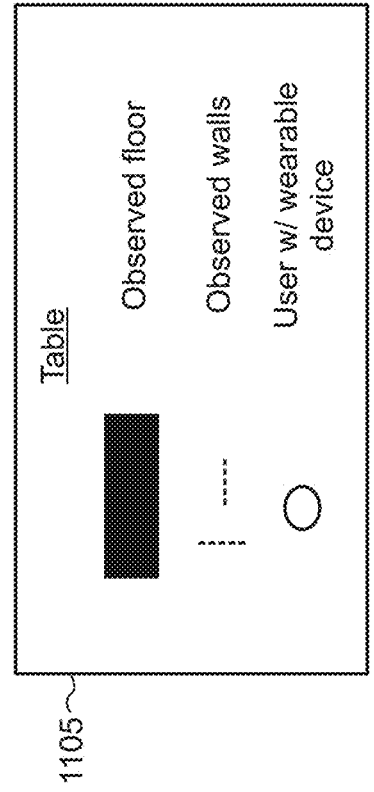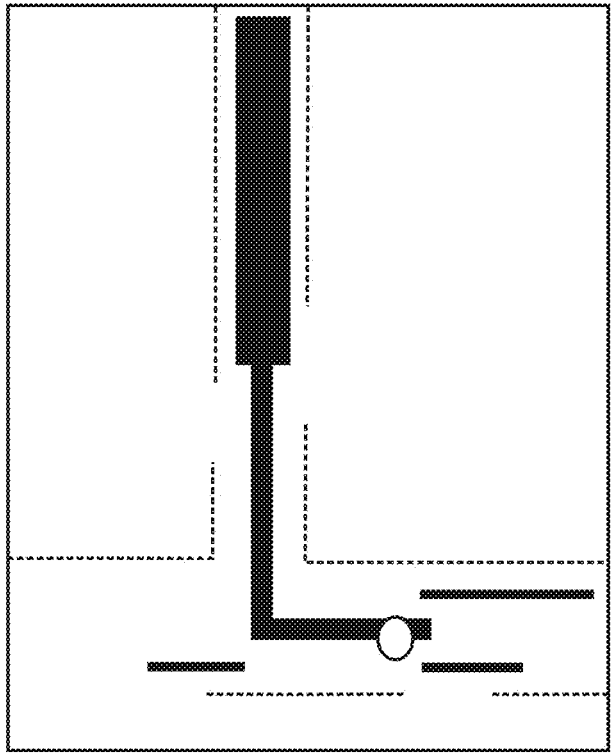
FIG 12

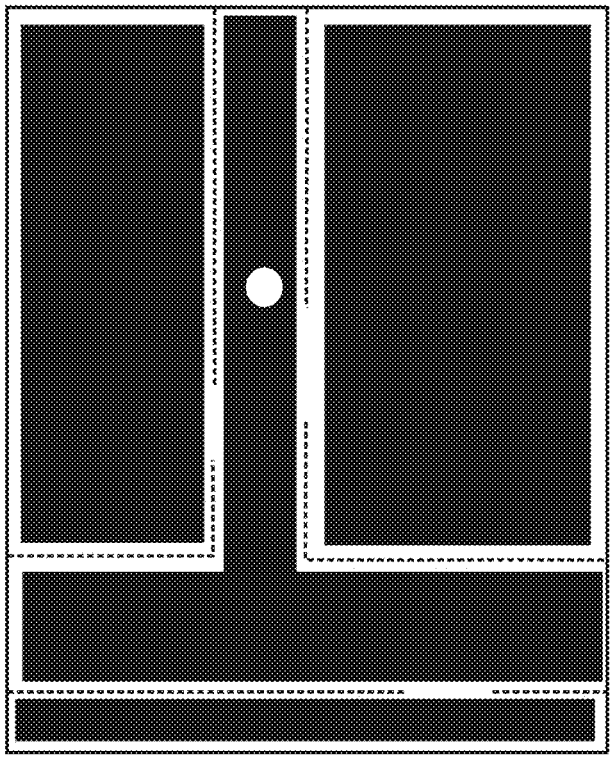
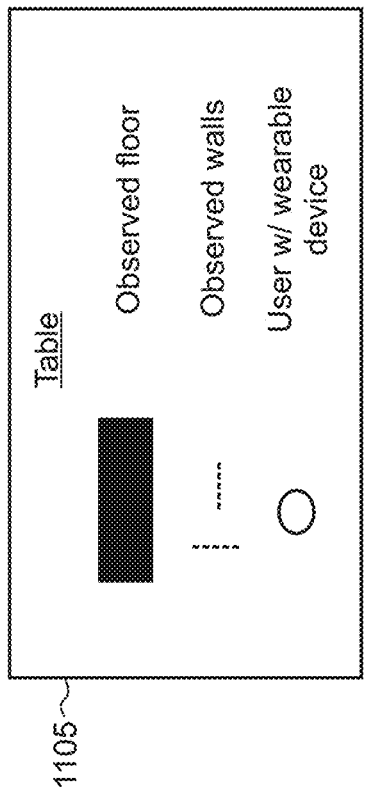
FIG 13

1500

1700

USING A ONE-DIMENSIONAL RAY SENSOR TO MAP AN ENVIRONMENT

BACKGROUND

Increasingly, alternate realities (e.g., augmented, virtual, or mixed realities) utilize the physical world to enhance user experiences, thus creating a greater importance for wearable devices to be aware of real life physical objects and surroundings while in use. An exemplary approach to developing maps or blueprints of the user's surroundings include employing expensive sensors and hardware that provide real-time surface reconstruction of the user's environment. This approach can be expensive and at times produce imperfect results.

SUMMARY

A wearable device implements a one-dimensional depth sensor, such as a LIDAR (Light Detection and Ranging) system, which is statically affixed to the wearable device and passively scans a physical environment, generates and stores points from the scan, and builds a blueprint for the physical environment, in which the blueprints are gradually built as the user navigates the area. The wearable device can include any one of a head-mounted display device, watch, head phones, and the like. The depth sensor is configured to continuously operate and detect the physical environment that the user navigates. To reduce cost, the depth sensor may operate in a fixed position on the wearable device and scan along a single axis; thus, the depth sensor operates and builds the environment according to the user's movements, position, and gaze direction. The depth sensor and wearable device are configured to generate a blueprint or map of the negative space in the user's environment using a point cloud structure based on the points derived from the depth sensor. The negative space for the blueprints include permanent structures such as walls, floors, countertops, ceilings, doorways, and the like. The wearable device is configured to distinguish between temporary (or movable) objects (e.g., a chair, pet, person, toys, etc.) from permanent structures. This way, a reliable blueprint of the building's architecture is generated without cluttering the blueprint or wasting unnecessary system memory and resources for transitory items.

The wearable device may first identify its location within the physical environment. Although the depth sensor itself can be used to recognize its location within the point cloud structure, other available sensor devices such as GPS, Wi-Fi (e.g., fingerprinting, triangulation, etc.), among others, can be used to help determine the location. Once position is known, these devices can be switched off to save power consumption, in which the wearable device can rely on the depth sensor for its location at that point forward. These localization devices can be used again if location becomes an issue, the wearable device is switched off, moves to a new location, etc.

Each point that the depth sensor generates represents a corresponding point in the physical environment. Each point is stored in a point cloud structure with defined coordinates (e.g., XYZ coordinates) for surface reconstruction of the environment. The depth sensor or map building application assigns a timestamp to each generated point so that points that are not verified within a pre-set time frame are set to expire. Generated points for locations that do not exist in memory are considered new, and therefore stored in memory. Generated points for locations within the point cloud structure that are currently associated with pre-existing points are updated or discarded depending on the scenario.

For example, when a location for a subsequent point corresponds to a location for a pre-existing point in the point cloud structure, then the updated timestamp may be applied to the pre-existing point and a reliability counter is increased for the pre-existing point. Depending on the configuration, the wearable device may use the subsequent point due to its recency, or alternatively, may maintain the pre-existing point if there is no discernable change. When a location for the subsequent point is different from the location for the pre-existing point, then the subsequent point may be discarded, or alternatively, may replace the pre-existing point. The subsequent point may be discarded when the reliability of the pre-existing point satisfies a threshold. When the pre-existing point is considered unreliable, the subsequent point may replace it. In one embodiment, the pre-existing point may be unreliable when it is believed to be associated with a temporary object as opposed to a permanent structure.

As the user navigates through the physical environment, such as a home, the wearable device continues to update and supplement the point cloud structure and blueprints with newly detected points. The completed blueprints can be useful for the wearable device itself, local applications on the wearable device, or for extensibility beyond the wearable device. For example, when the blueprints are completed, resource-intensive hardware components on the wearable device can be disabled or switched off, such as components that provide location information for the user. Since the user's relative location within the physical environment is known from the developed blueprints, some of these resource-intensive and power-consuming components can be temporarily disabled. Such components can include Wi-Fi transceivers, location components like GPS (Global Positioning System), or other depth sensors (in embodiments where multiple depth sensors are implemented) to detect the physical environment.

Advantageously, the single-axis depth sensor and wearable device provide a low-cost and low-power method to identify and develop the user's physical environment and thereby generate reliable blueprints. Over time, as the user continues to navigate a physical environment, the wearable device may stitch together pre-existing points with subsequent points. In addition, with notice to the user and user consent, multiple user environments can be stitched together to form blueprints to expedite the development process of the map. Specifically, the wearable device can utilize the collective points among multiple users to formulate the blueprints.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 11 shows an illustrative development of the blueprint after a walkthrough by a user wearing the wearable device;

FIG. 12 shows an illustrative gradual development of the blueprint after a subsequent walkthrough by the user wearing the wearable device;

FIG. 13 shows an illustrative completed blueprint after N number of walkthroughs by the user wearing the wearable device;

Like reference numerals indicate like elements in the drawings. Elements are not drawn to scale unless otherwise indicated.

DETAILED DESCRIPTION

Figure 1:
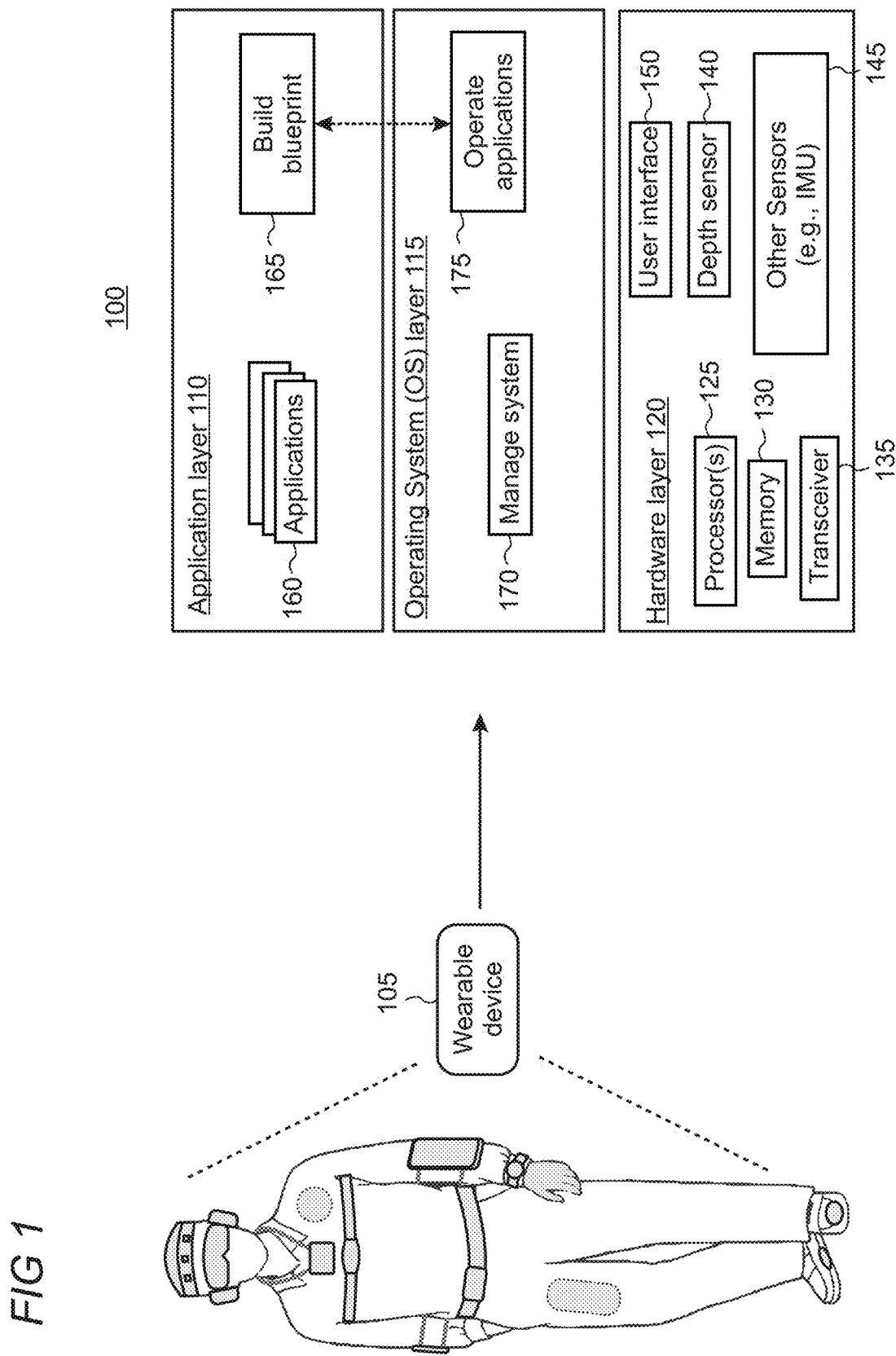
FIG. 1 shows an illustrative system architecture of a wearable device.

FIG. 1 shows an illustrative system architecture 100 of a wearable device 105. The wearable device 105 may include one or more of a variety of different computing devices that are configured to be readily and conveniently worn by the user to enable various functionalities and provide beneficial user experiences. For example, the wearable device 105 may be implemented using components that are donned like eyeglass, caps, gloves, headbands, headsets, hats, helmets, earbuds, shoes, wristbands, and belts, and/or be positioned on the user's body using attachments like neck straps, arm/leg straps, lanyards, and the like. Wearable devices may also be incorporated or embedded into clothing (as indicated by the dashed lines in FIG. 1). In typical implementations, wearable devices may be configured to provide hands-free and eyes-free experiences as the device operates, using battery power to facilitate portability and mobility.

Various types of user interfaces may be utilized by the wearable device 105 including displays and inputs systems. Some wearable devices may be operated through voice interaction and sensed gestures and/or user activity. Wearable devices may be configured to operate continuously in a non-intrusive manner and may also support functionalities and user experiences that rely on explicit user interactions or other user inputs. The wearable device may be further configured with communication and networking interfaces to enable it to interact with either or both local and remote users, devices, systems, services, and resources.

The wearable device 105 is configured to include various sensors, as described below, that may be configured to detect and/or measure motion, light, surfaces, temperature, humidity, location, altitude, and other parameters that are descriptive of the user or device environment. Other sensors may be supported on the wearable device which are positioned directly or indirectly on the user's body to monitor parameters that are descriptive of the user's physiological state such as movement, body and/or body part position or pose, pulse, skin temperature, and the like. The sensors may be operated in various combinations so that a given descriptive parameter may, in some cases, be derived by suitable systems in the wearable device using data from more than one sensor, or by combining sensor data with other information that is available to the device.

In simplified form, the architecture 100 is conceptually arranged in layers and includes a hardware layer 120, operating system (OS) layer 115, and application layer 110. The hardware layer 120 provides an abstraction of the various hardware used by the wearable device 105 (e.g., input and output devices, networking and radio hardware, etc.) to the layers above it. In this illustrative example, the hardware layer supports processor(s) 125, memory 130, transceiver (e.g., network connectivity hardware) 135, a depth sensor 140, other sensory devices (e.g., Inertial Measurement Unit (IMU)) 145, and input/output, speakers, microphones, buttons, and the like (not shown). The wearable device depicts various components 155 which can represent the hardware components in the hardware layer. The representation of depth sensor 140 on the wearable device is exemplary and other such locations on the wearable device are also possible.

Figure 2:
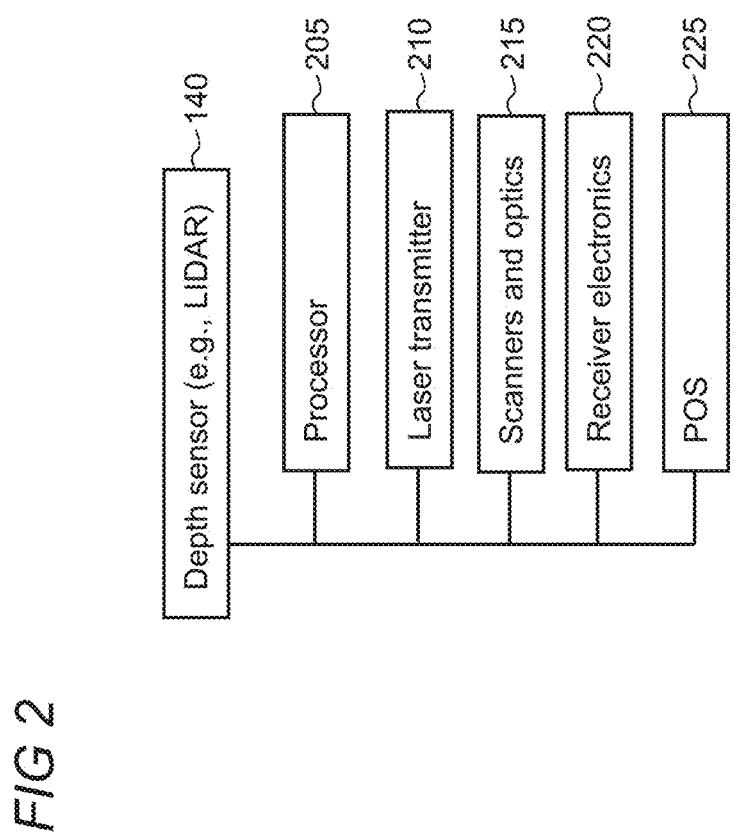
FIG. 2 shows illustrative components of an exemplary depth sensor using a LIDAR system.

FIG. 2 shows illustrative components of an exemplary depth sensor 140 using a Light Detection and Ranging (LIDAR) system. Generally, LIDAR measures distance to a target and builds an image that represents external surface properties of a target or physical environment. LIDAR transmits laser pulses and scans properties of the reflected laser pulses to build point cloud data points based on XYZ coordinates, in which the point cloud data points represent an external surface of a target object or physical environment. The point cloud data points or structure may be stored in memory either locally, at a remote service, or a combination thereof. In this regard, reference to points herein pertain to the data points generated from LIDAR or other depth sensor, each point of which represents a scanned point of the real-world and physical environment.

Typical components of LIDAR include a processor 205 to build the image based on scanned reflective properties, laser transmitter 210 (e.g., ultraviolet, visible or infrared), scanners and optics 215 (e.g., fixed position scanner/sensor), receiver electronics 220 (e.g., photodetector or solid state detector), and positioning and orientation system (POS) 225 (e.g., GPS and IMU). The POS may provide the location and orientation (e.g., pitch, yaw, roll) for the LIDAR to sense and generate points for coordinates. The LIDAR may use local or remote components for the POS, in which the projected ray from the scanner can be performed regardless of where or how POS is calculated. For example, the wearable device may be configured as a beacon that is detected from external components, such as a camera, which can therefore externally detect the POS characteristics of the wearable device. Although LIDAR is shown in FIG. 2 as the implemented depth sensor, alternative sensors which can be used in alternative embodiments include RADAR (Radio Detection and Ranging), ultrasonic systems, and passive visual systems.

Returning to FIG. 1, the application layer 110 in this illustrative example supports various applications 160, including an application configured to build blueprints 165 as discussed herein. The application to build blueprints can use the point cloud data points from the LIDAR, or other depth sensor, to build the physical environment around the user in a map. As discussed herein, the blueprints are built over time upon each occurrence in which the user navigates an environment. New data points that are currently undiscovered within the physical environment supplement or update the point cloud structure to create a reliable and complete blueprint for an environment over time.

Other applications not shown can include a web browser configured to provide connectivity to the world wide web, games, etc. Although certain applications are depicted in FIG. 1, any number of applications can be utilized by the wearable device, whether proprietary or developed by third-parties. The applications are often implemented using locally executing code. However, in some cases these applications can rely on services and/or remote code execution provided by remote servers or other computing platforms such as those supported by a service provider or other cloud-based resources (FIG. 3).

The OS layer 115 supports, among other operations, managing system 170 and operating applications 175, such as operate the build blueprint application 165 (as illustratively shown by the arrow). The OS layer may interoperate with the application and hardware layers in order to perform various functions and features.

Figure 3:
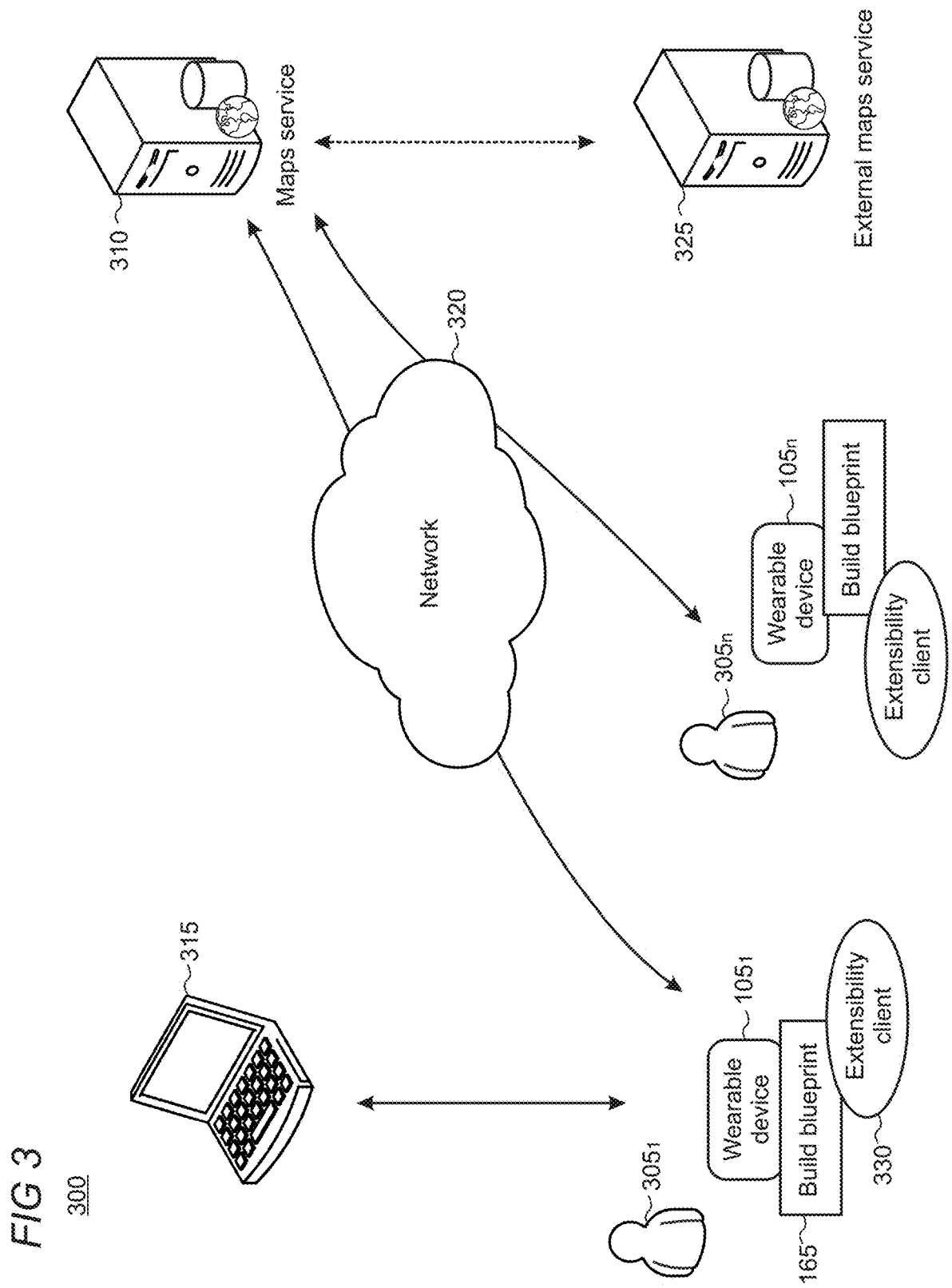
FIG. 3 shows an illustrative environment of computing devices interacting over a network.

FIG. 3 shows an illustrative environment 300 in which a user 305 operates the wearable device 105, and the wearable device is configured to interoperate with external computing devices such as a remote maps service 310 and client device 315 over network 320. The network can include any number and combination of local area network, wide area network, the Internet, or the World Wide Web. The external computing devices can interoperate with an extensibility client 330 of the build blueprint application 165, in which the external computing devices can, in whole or in part, build the blueprints upon receiving the collected data points from the wearable device's depth sensor. Therefore, any discussion with respect to the development of blueprints and a point cloud structure using generated points can be local to the wearable device, external thereto at external computing devices, or a combination thereof.

Additionally, an external maps service 325 may communicate with the maps service 310 or other computing devices shown in FIG. 3. The external maps service can store external maps that represent the user's physical environment which are different from the developed blueprints. These external maps may include maps previously built using surface reconstruction techniques, maps directly input by a user, maps obtained from public or private sources, etc. The external maps service may use the blueprints derived from the wearable device to verify and/or update content within these external maps, or vice versa. Thus, if an external map depicts floorplans for an office building which places a wall at a location contrary to the developed blueprint, then the external map may be updated accordingly, either with a correction to the external map itself or a notation that the map may be inaccurate.

The environment 300 may include multiple users and wearable devices configured like wearable device 105, as representatively shown by reference numerals 305n and 105n. Blueprints can be built using data points derived from a single user or multiple users. Upon notice to the user and user consent, the maps service 310 may combine and share developed blueprints and point cloud structures derived from a multitude of users. Since the present system develops the blueprints over time, additional users navigating an environment allows greater opportunities for depth sensors to capture points of the user's physical environment, and thereby hastens the process and shortens the time period for the blueprints to develop.

Figure 4:
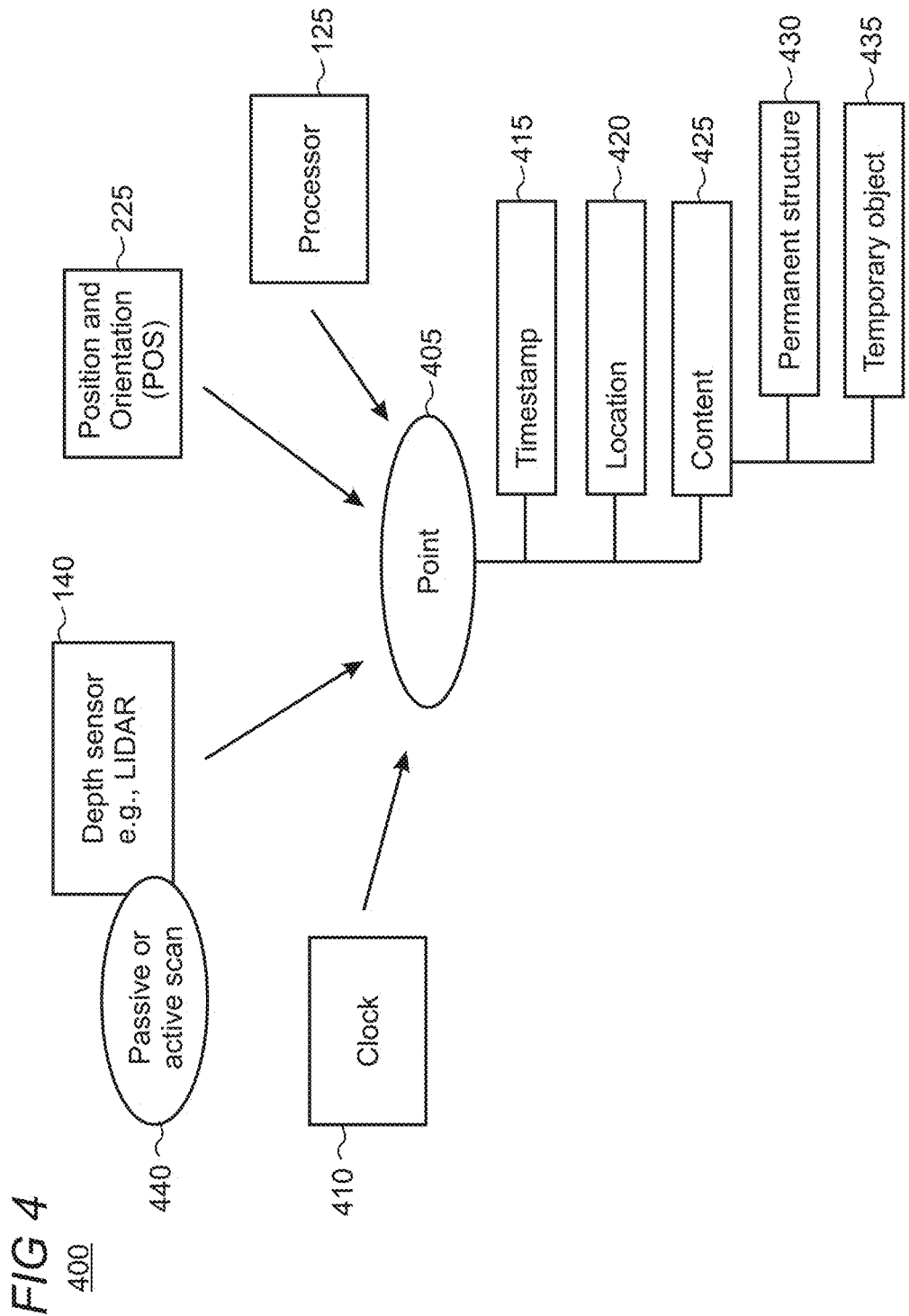
FIG. 4 shows an illustrative diagram of a created point and associations with the point.

FIG. 4 shows an illustrative high-level diagram 400 in which the various hardware components (FIGS. 1 and 2) are utilized to develop a point 405 for the point cloud structure. Using a passive or active scan 440, the depth sensor (e.g., LIDAR) 140, POS 225, processor 125, and clock 410 are configured to generate individual points and point characteristics which correspond to scanned points in the physical environment. Each point or group of points is assigned a timestamp 415 (e.g., a date and time the point is generated), a location 420 (e.g., using a coordinate system such as XYZ coordinates), and content 425.

The content 425 can provide an indication or inference as to whether the point or group of points is associated with a permanent structure 430 or temporary object 435. The present system is configured to build blueprints for negative space defined by permanent structures associated with the physical environment, such as walls, floors, ceilings, doorways, beams, structural support, windows, foyers and other structural surface characteristics. Therefore, temporary and movable objects, such as people, pets, toys, chairs, waste baskets, and the like may be discarded from the developed blueprints. Criteria may be utilized to distinguish between temporary objects and permanent structures, such as by comparing pre-existing points to newly generated points.

Figure 5:
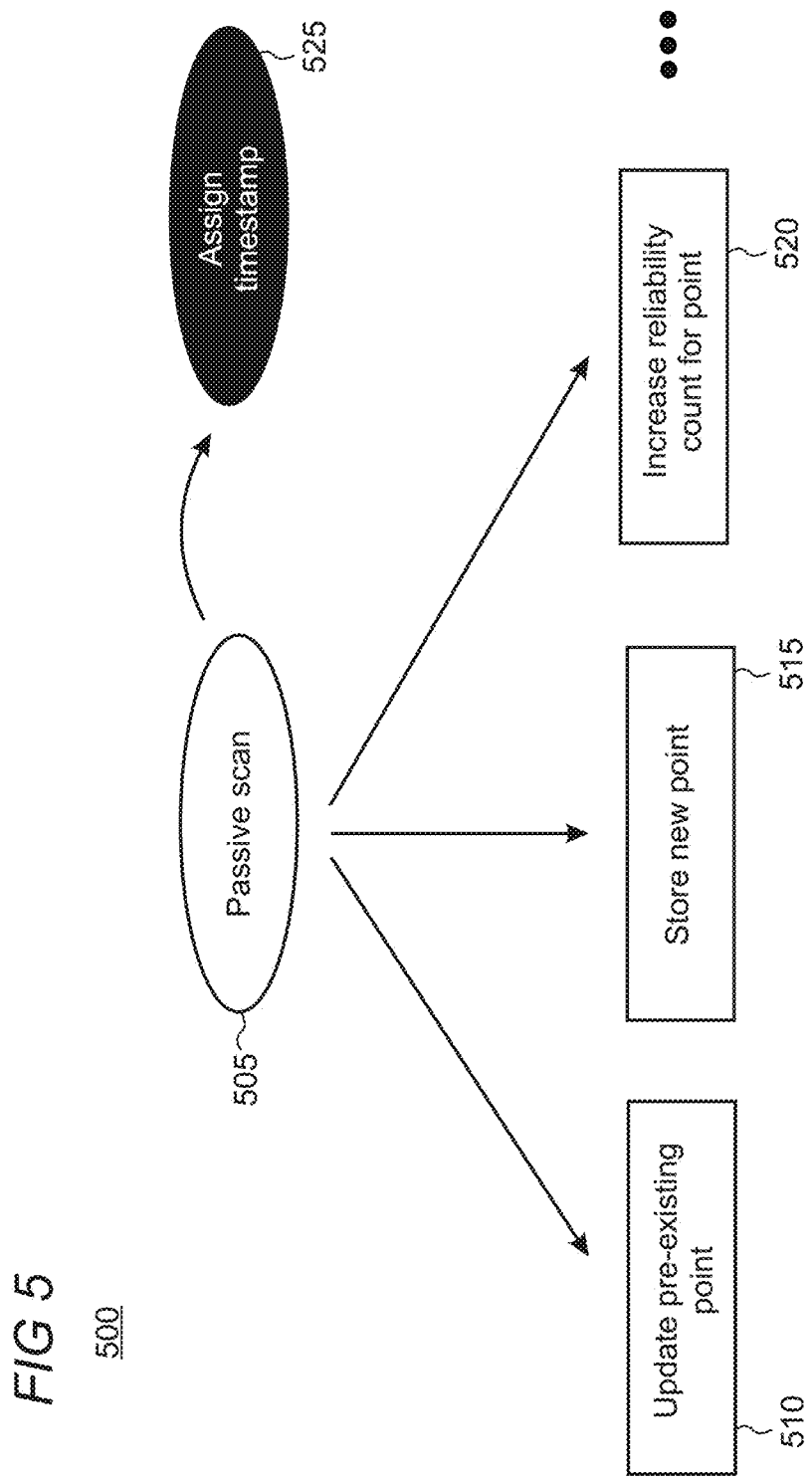
FIG. 5 shows illustrative operations after a passive scan by the depth sensor.

FIG. 5 shows an exemplary diagram 500 of a passive scan 505 performed by the depth sensor and subsequent processing performed for each generated point. Since a low-cost depth sensor is statically affixed to the wearable device, the scan may be passive in that it performs a one-dimensional scan along a single axis according to the direction in which the user faces. The passive scan along a single axis may be utilized to reduce cost, weight, and power consumption of the wearable device and save real estate by using quantitatively less sensors. In alternative embodiments, multiple depth sensors configured to perform two- or three-dimensional scans along two or three axes can be performed to scan a greater number of points.

Additionally, the depth sensor may perform the passive scan when the depth sensor or wearable device's location is known. In this regard, localization techniques can include using, with notice to the user and user consent, one or more of GPS, Wi-Fi fingerprinting or other Wi-Fi localization techniques using signal strength, Bluetooth® beaconing, and the like. Once the location of the wearable device is known, these additional localization components can be switched off to save battery power, but can be switched on again if the depth sensor has trouble identifying its relative location. In order to identify its location, the depth sensor can use a developed point cloud structure to locate its position and orientation using scanned data points.

After the passive scan generates a point for a surface, the wearable device may update a pre-existing point 510, store a new point 515, increase a reliability count for a point 520, or perform other operations as represented by the ellipsis. Any one or more of these operations may be performed for each point. Each point may be assigned a timestamp 525, which can occur at any stage of the process (e.g., before, or contemporaneous with, operations at numerals 510, 515, and 520). The timestamp may be assigned by the depth sensor or the processor during development of the blueprint.

The wearable device may update a pre-existing point if the generated point shares or conflicts with a location of the pre-existing point in the point cloud structure. The wearable device may store a new point if no corresponding point currently exists in the point cloud structure. Whether the generated point updates a pre-existing point or is stored as a new point, a reliability count may be incremented. The reliability count represents a confidence value that the point is accurate. For example, a pre-existing point that has been verified several times based on subsequent scans provides a relatively strong indication that the point is accurate and that the point is not associated with a transitory or temporary object.

Figure 6:
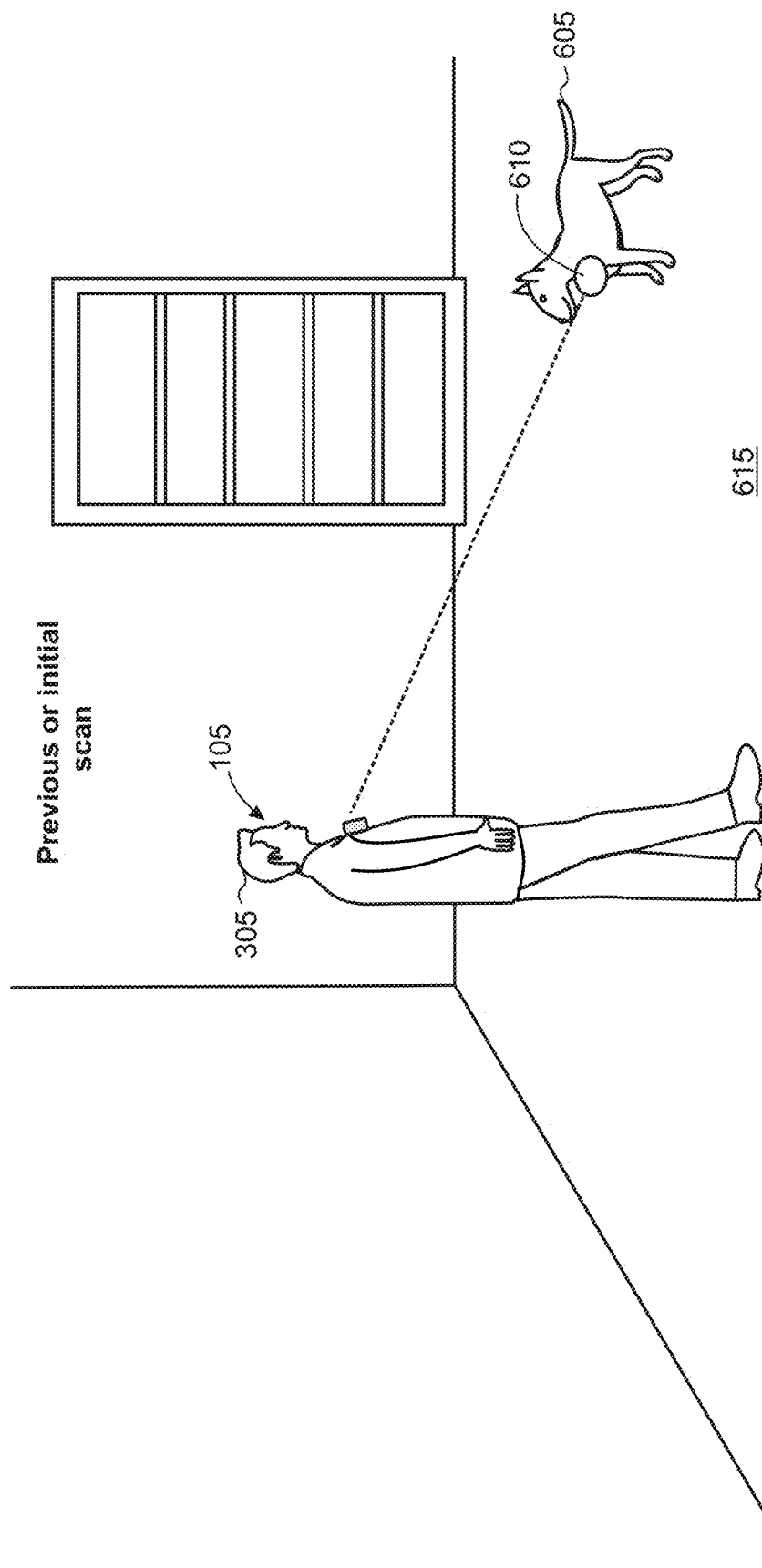
FIG. 6 shows an illustrative original point picked up by the depth sensor.
Figure 7:
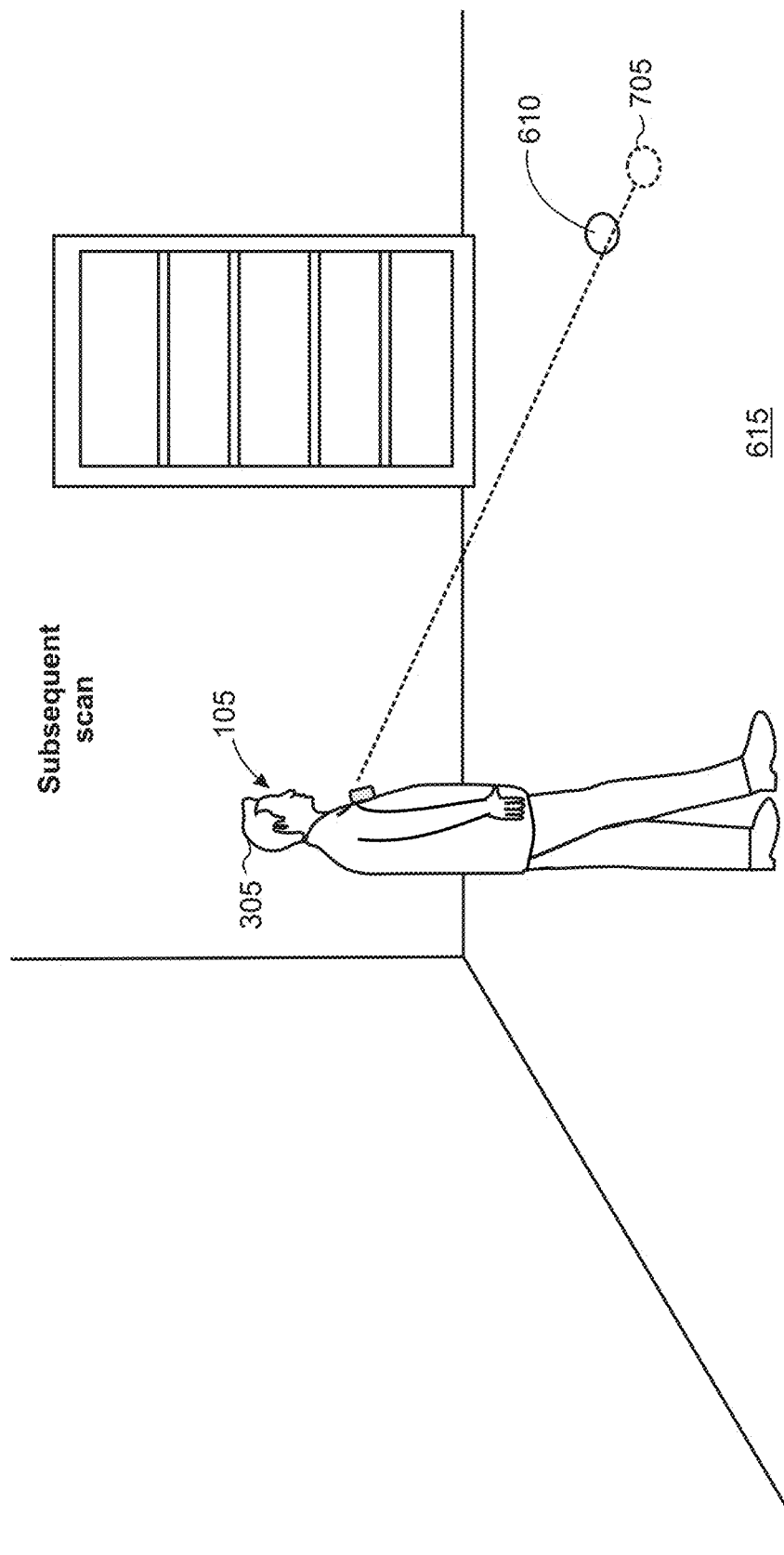
FIG. 7 shows an illustrative subsequent point picked up by the depth sensor.

FIGS. 6 and 7 show illustrative sequential environments where a point generated from a previous scan changes during a subsequent scan. For example, the user 305 operates the wearable device 105 which projects a one-dimensional ray at a dog 605 in the direction of the user's gaze. In this example, the dog represents a transitory object. The depth sensor detects that the location (e.g. coordinates) for a point 610 is elevated above the floor 615 and stores the point in the point cloud structure.

FIG. 7 represents a temporally subsequent scan, such as later that day, the next day, or the following week, in which the dog is no longer present. During this scan the location for the point changed as shown in the different locations for pre-existing point 610 and subsequent point 705. The subsequent point 705 represents a location on the floor 615. The wearable device may delete the pre-existing point 610 and update the point cloud structure with the subsequent point 705. A reliability counter may be refreshed for point 705 since the pre-existing point has been deleted.

Differences in point locations may be identified based on the depth sensor's position and orientation systems and utilization of the point cloud structure. For example, the position and orientation systems identify a similar angle and location under similar circumstances between FIGS. 6 and 7. The point cloud structure may have indicated that the location for point 705 previously represented a surface several inches or feet above the floor (FIG. 6), which was contrary to current data. Thus, the position and orientation systems and point cloud structure together indicate distances, differences, and similarities between points.

In alternative embodiments, points that represent a permanent structure, such as the floor 615, may be maintained if a subsequent scan shows a different point location. For example, over time the reliability increases for points associated with permanent structures by confidence measures such as the reliability counter. Therefore, transitory objects that are picked up by subsequent scans may be discarded when reliability for a pre-existing point surpasses a threshold (e.g., five verifications for the pre-existing point). In other embodiments, certain points may be outliers when compared with a group of points, and thereby discarded. For example, algorithms that compare adjacent or surrounding points can provide indications as to whether a certain point is an outlier (e.g., transitory), or comports with the layout of other known points.

Figure 8:
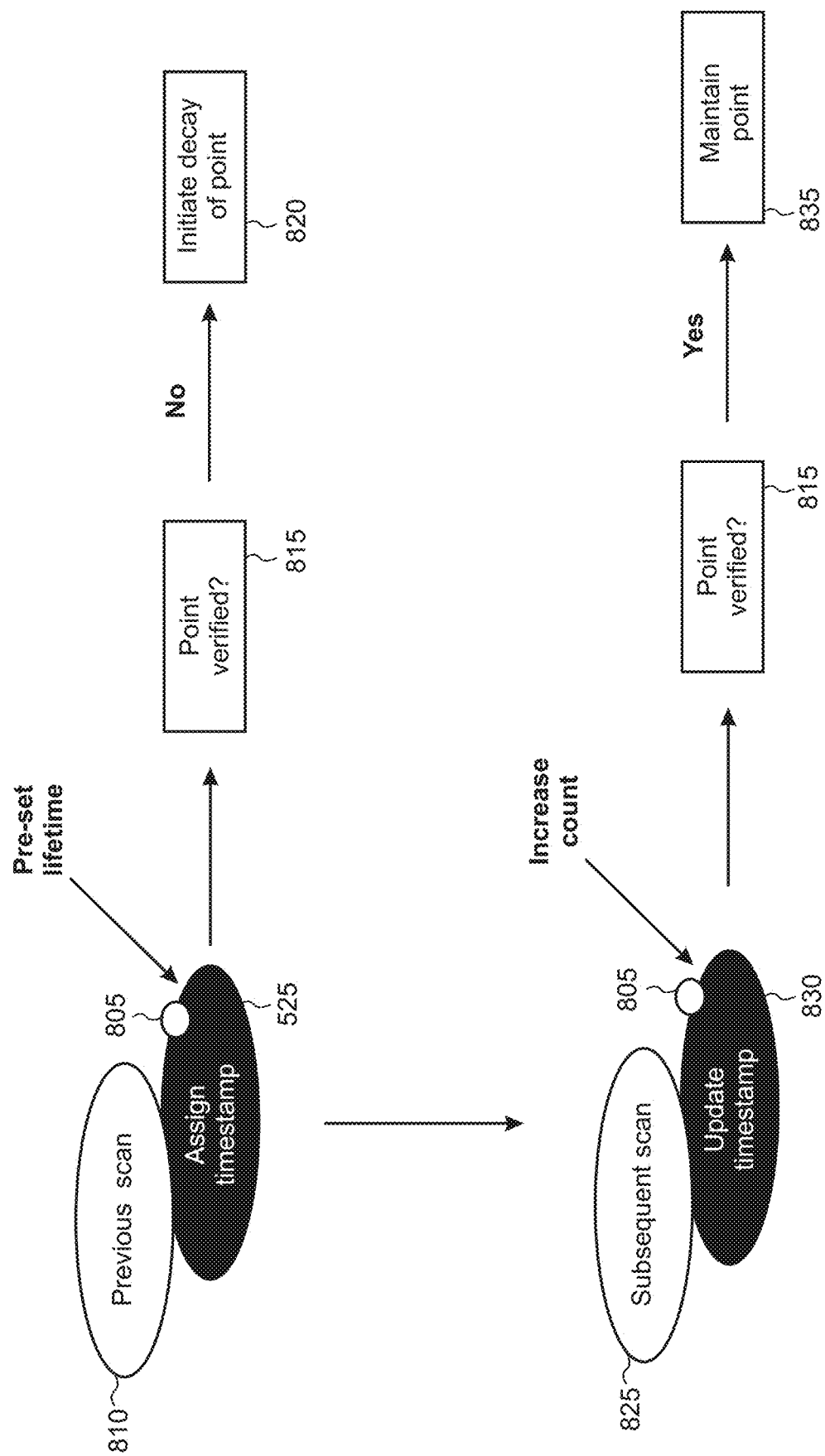
FIG. 8 shows an illustrative lifespan of a point.

FIG. 8 shows an illustrative diagram 800 in which the wearable device initiates a decay process of a point 805 after expiration of the point's lifetime using the point's assigned timestamp 525. For example, all points may be assigned a pre-set lifetime during a previous scan 810. The previous scan may be an initial scan of a point or may be temporally prior to a subsequent scan 825. The pre-set lifetime may be a date and time for the point to expire or a timer that counts down. If the point is not verified 815 before expiration of the lifetime, such as picked up in a subsequent scan, the wearable device initiates a decay process 820 of the point. The decay process can include deleting the point upon expiration of its lifetime.

In another example, the subsequent scan 825 may pick up and generate a point that corresponds to the point 805, in which case the point 805 becomes pre-existing. When this occurs the wearable device increases the reliability counter for the pre-existing point, updates the point's timestamp 830, confirms that the point is verified 815, and maintains the point in the point cloud structure 835. After verification, the point may continue to be assigned a pre-set lifetime that requires verification. Alternatively, the pre-set lifetime may be assigned when the reliability counter or confidence value for a point has not met a threshold. Thus, a point may stop being assigned a lifetime if its reliability counter (e.g., a reliability counter of seven) or confidence value satisfies a threshold value.

Figure 10:
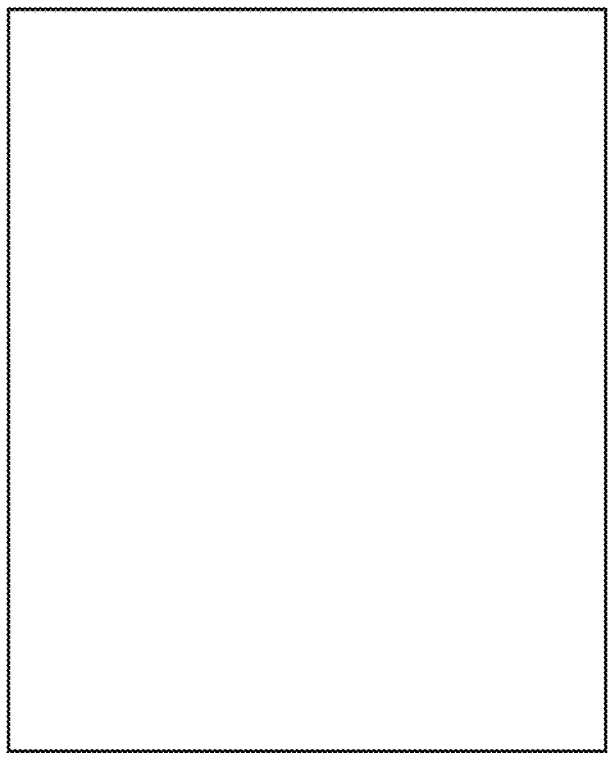
FIG. 10 shows an illustrative initial blueprint for the physical environment of FIG. 9.
Figure 9:
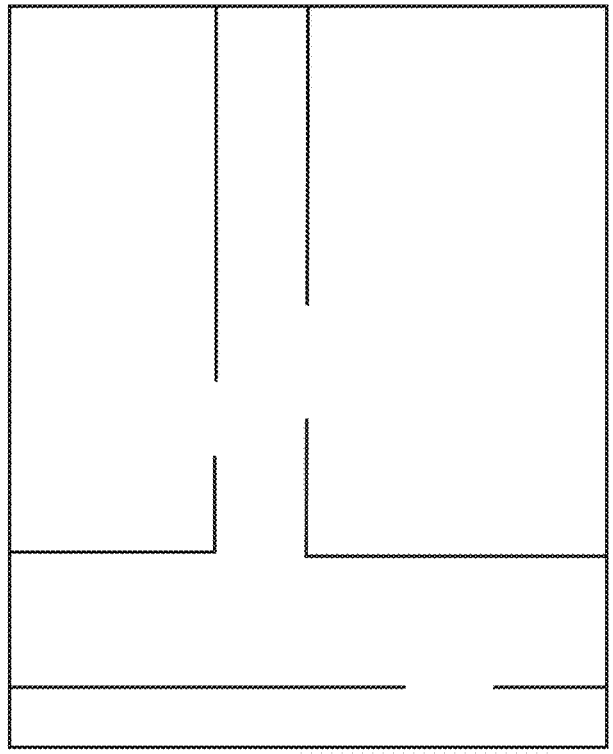
FIG. 9 shows an illustrative real-world layout of a physical environment.

FIGS. 9-14 show exemplary diagrams for a physical environment for which blueprints gradually develop over time. FIG. 9 shows an actual layout of an exemplary physical environment 900, such as an office building, home, store, etc. FIG. 10 shows an initial blueprint of the negative space for the environment 900 which is stored in memory. The wearable device has not yet formulated or developed a blueprint for the environment since the wearable device has yet to navigate the space.

With reference to table 1105, FIGS. 11-13 show the gradual development of the blueprint for the layout in FIG. 9. For example, FIG. 11 shows an initial development of the negative space blueprint represented as permanent or non-transient structures (e.g., floor and walls) after a first walk-through by the user. FIG. 12 shows the gradual development of the negative space during one or more subsequent walkthroughs. FIG. 13 shows a virtually completed blueprint after N number of walkthroughs.

Blueprints may continue to develop over long periods of time, such as weeks, months, or years. The development of the blueprints depends on the amount of time the user navigates through a building and the extent of the user's coverage of the building. For example, a user who navigates many areas of a physical space may cause the wearable device to develop blueprints for an environment relatively quicker than a user who only traverses a single hallway or portion of a physical space.

The development progression depicted in FIGS. 11-13 may be based on different times the user navigated the defined space of the environment. For example, a user with his wearable device may navigate the area one day and subsequently depart the defined area. When the user subsequently returns to that same defined area, such as later that day, the next day, or weeks, months, or years later, the point cloud structure and blueprint will continue to develop and build on top of the previously generated points. This process repeats itself so the blueprints continue to develop over time.

Figure 14:
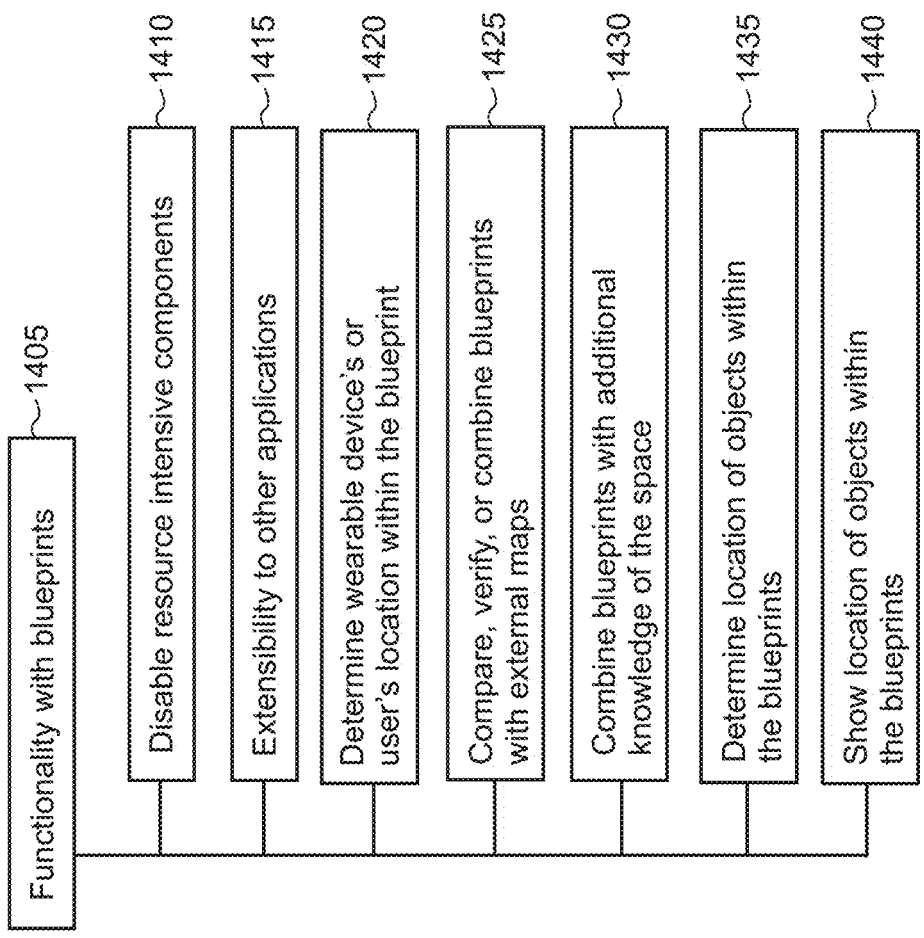
FIG. 14 shows an illustrative taxonomy of functions or uses of the blueprint for the wearable device or other computing devices.

Developed blueprints can serve various purposes and functions. FIG. 14 shows an illustrative taxonomy of functions 1405 for which blueprints can be used. The various functions may be utilized while the map is currently in development or when the map is completed beyond a threshold level. For example, the threshold level may be a percentage (e.g., 75%, 90%, etc.) of completion of a room, building, or defined area.

When blueprints for a physical environment are completed beyond a threshold, the wearable device may disable resource intensive components 1410, which thereby allows the wearable device to enter a low-power state. For example, if multiple depth sensors are implemented to capture points for the environment, one or more of the depth sensors may be switched off or disabled since the physical environment is sufficiently known. The wearable device may disable certain positioning or orientation sensors (e.g., Wi-Fi transceiver, GPS, or IMU) since the wearable device can rely more heavily on the developed blueprints.

Additional functionality provided by the blueprints include extensibility to other applications (e.g., location-aware applications) 1415, determining wearable's or user's location within the blueprint 1420, comparing, verifying, or combining blueprints with external maps 1425, combining blueprints with additional knowledge of the space 1430, determining location of objects within the blueprints 1435, or showing location of objects within the blueprints 1440.

Figure 15:
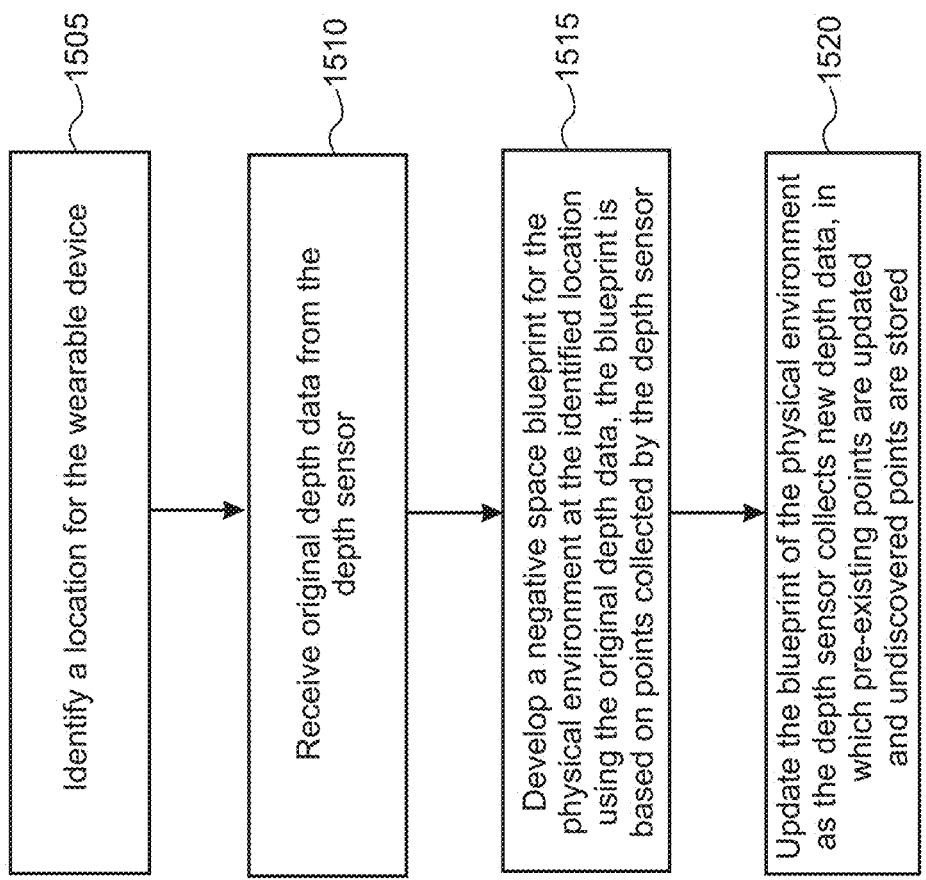
FIGS. 15-17 show illustrative processes performed by one or more wearable devices or computing devices.

FIG. 15 is a flowchart of an illustrative method 1500 in which a wearable device updates a blueprint of a physical environment. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1505 a location is identified for the wearable device. For example, the location can be identified using GPS, the user's position relative to a Wi-Fi access point, among other options. In step 1510, original depth data is received from a depth sensor. In step 1515, a negative space blueprint is developed for the physical environment at the identified location using the original depth data. The developed blueprint is based on points collected by the depth sensor. In step 1520, the blueprint of the physical environment is updated as the depth sensor collects new depth data, in which pre-existing points are updated and presently undiscovered points are stored.

Figure 16:
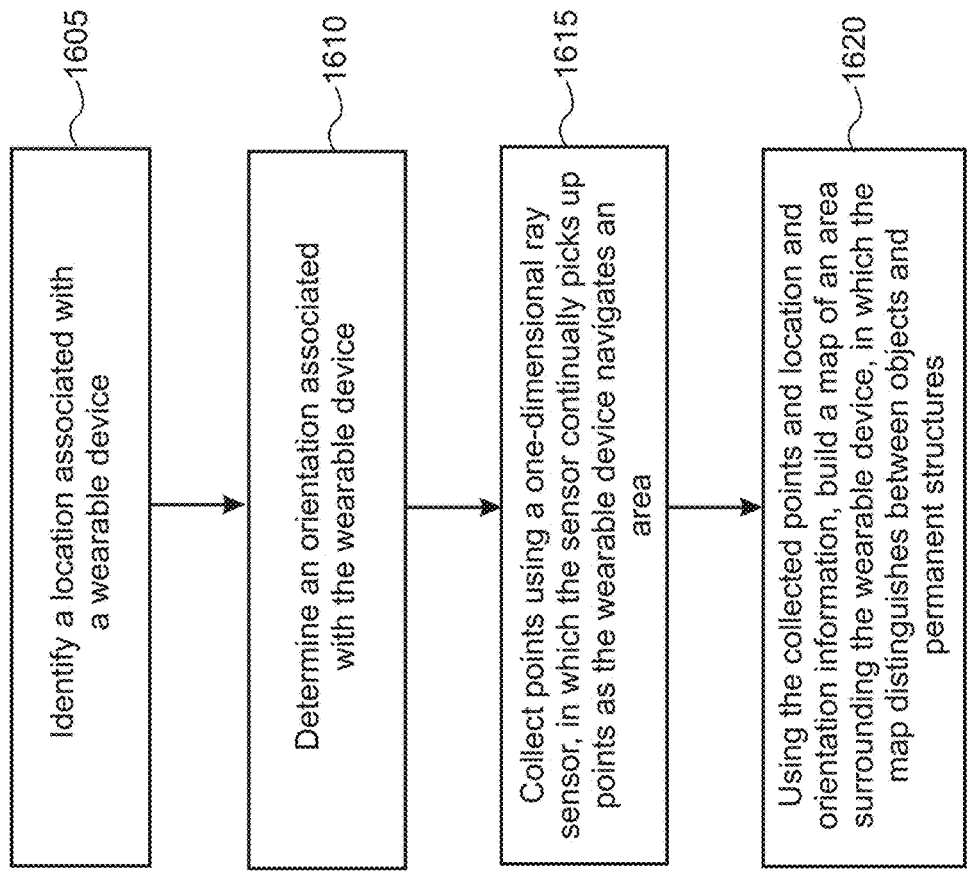

FIG. 16 is a flowchart of an illustrative method 1600 which the wearable device may employ to differentiate between temporary or transient objects and permanent structures. In step 1605, a location for a wearable device is identified. In step 1610, an orientation associated with the wearable device is determined. In step 1615, points are collected using a one-dimensional sensor, in which the sensor continually picks up points as the wearable device navigates an area. The wearable device may navigate an area, for example, while the user wears the wearable device and walks around a room. In step 1620, the collected points and location and orientation information are used to build a map of an area surrounding the wearable device, in which the map distinguishes between objects and permanent structures. Permanent structures are desired since the wearable device seeks to build a map of the physical environment that has future utility. That is, storing knowledge of the current location of a pet or chair may have little use in the future when those objects move. Thus, the system seeks to identify negative space of the objects in the form of permanent structures, such as walls, ceilings, doorways, structural support, beams, etc.

Figure 17:
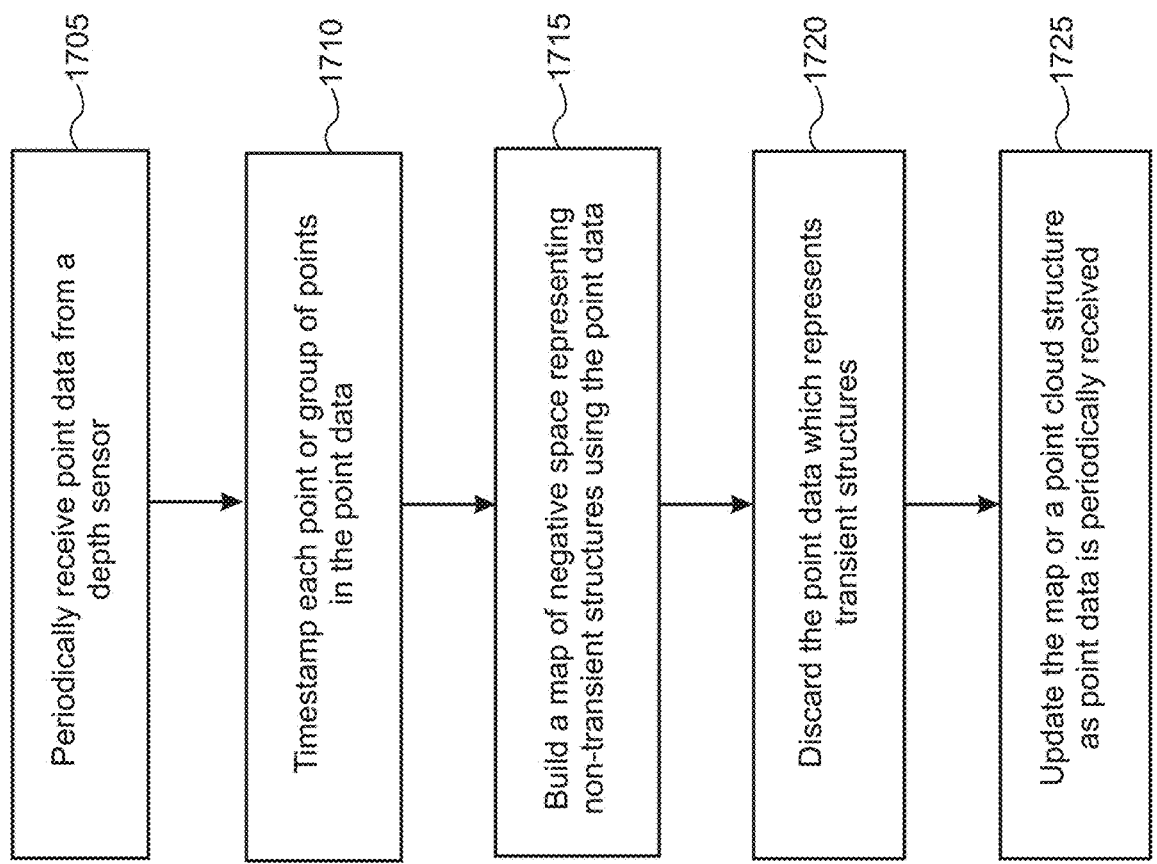

FIG. 17 is a flowchart of an illustrative method 1700 in which a computing device, such as a wearable device, discards points which represent transient structures and updates a point cloud structure as the device continues to receive point data. In step 1705, point data is periodically received from a depth sensor. In step 1710, each point or group of points is timestamped. In step 1715, a map of negative space is built using the point data, in which the map represents non-transient structures. In step 1720, point data which represents transient structures are discarded. In step 1725, a map or a point cloud structure is updated as the point data is periodically received.

Figure 18:
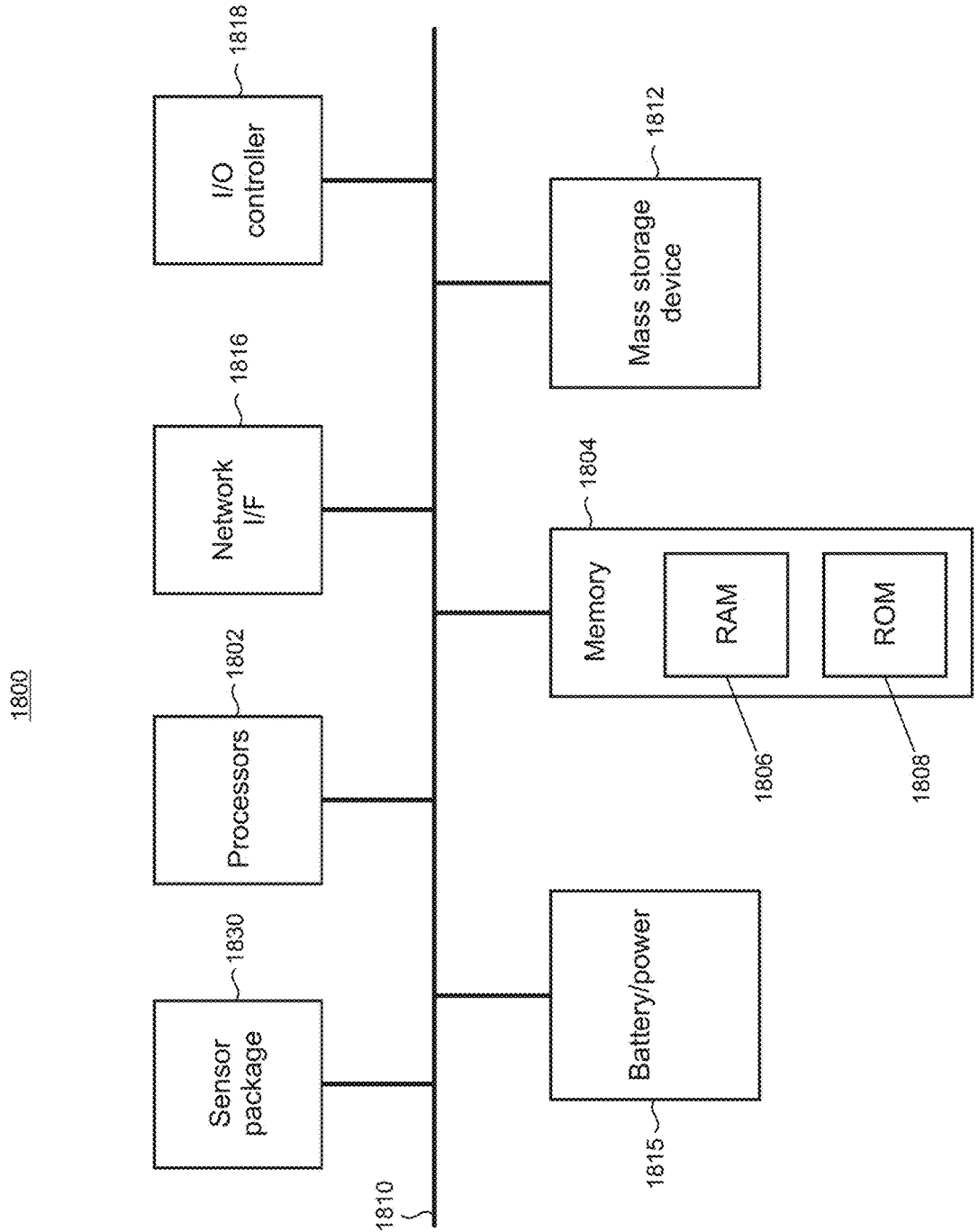
FIG. 18 a simplified block diagram of an illustrative wearable device that may be used in part to implement the use of the one-dimensional ray sensor to map an environment.

FIG. 18 shows an illustrative architecture 1800 for a device capable of executing the various components described herein for providing the present user and device authentication for web applications. Thus, the architecture 1800 illustrated in FIG. 18 shows an architecture that may be adapted for a wearable device, a server computer, mobile phone, a PDA, a smartphone, a desktop computer, a netbook computer, a tablet computer, GPS device, gaming console, and/or a laptop computer. The architecture 1800 may be utilized to execute any aspect of the components presented herein.

The architecture 1800 illustrated in FIG. 18 includes one or more processors 1802 (e.g., central processing unit, graphic processing units, etc.), a system memory 1804, including RAM (random access memory) 1806 and ROM (read only memory) 1808, and a system bus 1810 that operatively and functionally couples the components in the architecture 1800. A basic input/output system containing the basic routines that help to transfer information between elements within the architecture 1800, such as during startup, is typically stored in the ROM 1808. The architecture 1800 further includes a mass storage device 1812 for storing software code or other computer-executed code that is utilized to implement applications, the file system, and the operating system. The mass storage device 1812 is connected to the processor 1802 through a mass storage controller (not shown) connected to the bus 1810. The mass storage device 1812 and its associated computer-readable storage media provide non-volatile storage for the architecture 1800. Although the description of computer-readable storage media contained herein refers to a mass storage device, such as a hard disk or CD-ROM drive, it may be appreciated by those skilled in the art that computer-readable storage media can be any available storage media that can be accessed by the architecture 1800.

The architecture 1800 further supports a sensor package 1830 comprising one or more sensors or components that are configured to detect parameters that are descriptive of the environment and/or detect parameters that are descriptive of the device user, or combinations therein. For example, for a wearable computing device, the sensors may be positioned directly or indirectly on the user's body. The sensors may be configured to run continuously, or periodically, and typically in hands-free and/or eyes-free manners. The architecture further supports power and/or battery components (collectively identified by reference numeral 1815). For example, in wearable device applications, one or more batteries or power packs may be rechargeable or replaceable to facilitate portability and mobility.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1800.

According to various embodiments, the architecture 1800 may operate in a networked environment using logical connections to remote computers through a network. The architecture 1800 may connect to the network through a network interface unit 1816 connected to the bus 1810. It may be appreciated that the network interface unit 1816 also may be utilized to connect to other types of networks and remote computer systems. The architecture 1800 also may include an input/output controller 1818 for receiving and processing input from a number of other devices, including a keyboard, mouse, touchpad, touchscreen, control devices such as buttons and switches or electronic stylus (not shown in FIG. 18). Similarly, the input/output controller 1818 may provide output to a display screen, user interface a printer, or other type of output device (also not shown in FIG. 18).

The architecture 1800 may include a voice recognition unit (not shown) to facilitate user interaction with a device supporting the architecture through voice commands, a natural language interface, or through voice interactions with a personal digital assistant (such as the Cortana® personal digital assistant provided by Microsoft Corporation). The architecture 1800 may include a gesture recognition unit (not shown) to facilitate user interaction with a device supporting the architecture through sensed gestures, movements, and/or other sensed inputs.

It may be appreciated that the software components described herein may, when loaded into the processor 1802 and executed, transform the processor 1802 and the overall architecture 1800 from a general-purpose computing system into a special-purpose computing system customized to facilitate the functionality presented herein. The processor 1802 may be constructed from any number of transistors or other discrete circuit elements, which may individually or collectively assume any number of states. More specifically, the processor 1802 may operate as a finite-state machine, in response to executable instructions contained within the software modules disclosed herein. These computer-executable instructions may transform the processor 1802 by specifying how the processor 1802 transitions between states, thereby transforming the transistors or other discrete hardware elements constituting the processor 1802.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1800 in order to store and execute the software components presented herein. It also may be appreciated that the architecture 1800 may include other types of computing devices, including wearable devices, handheld computers, embedded computer systems, smartphones, PDAs, and other types of computing devices known to those skilled in the art. It is also contemplated that the architecture 1800 may not include all of the components shown in FIG. 18, may include other components that are not explicitly shown in FIG. 18, or may utilize an architecture completely different from that shown in FIG. 18.

Figure 19:
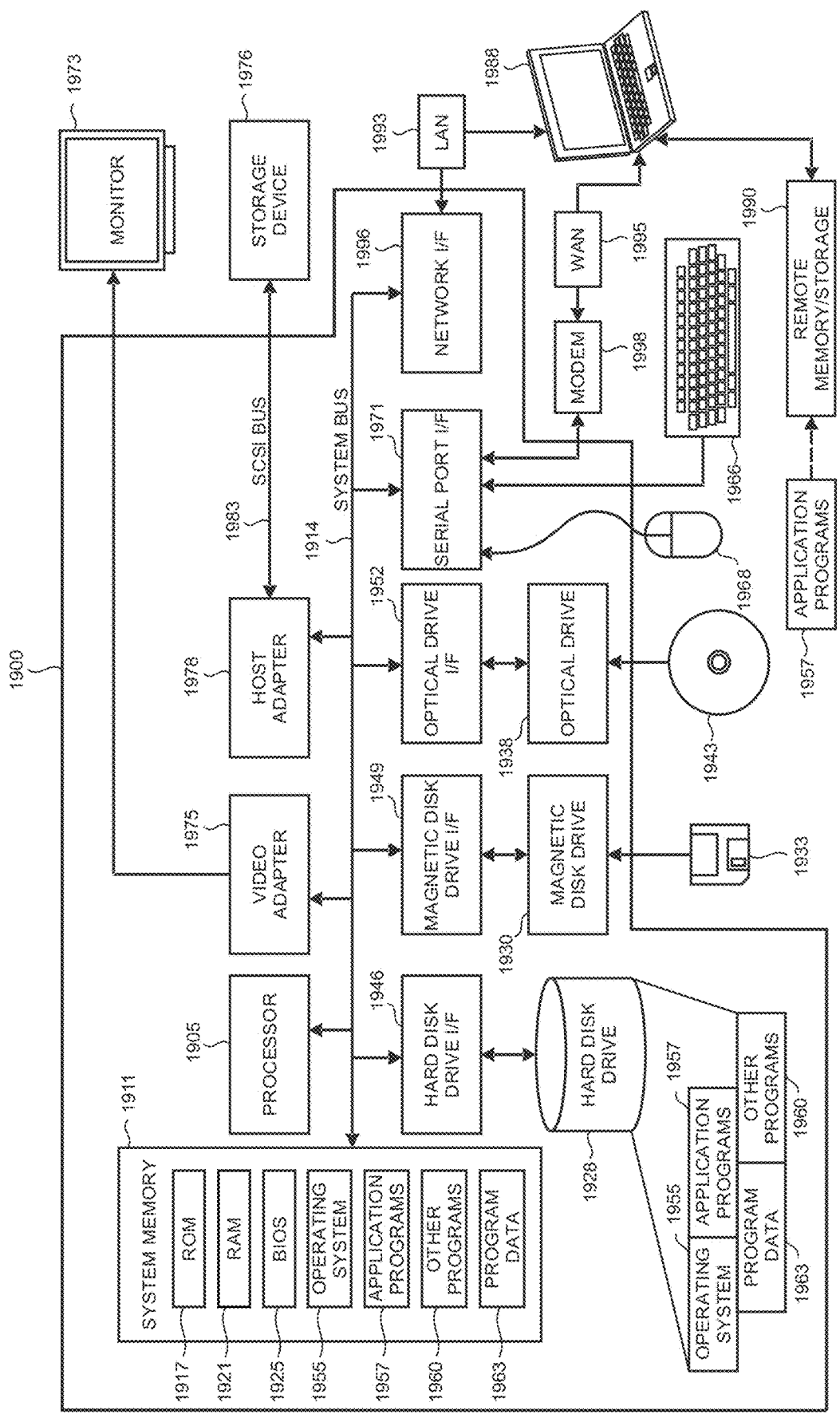
FIG. 19 is a simplified block diagram of an illustrative computer system that may be used in part to implement the use of the one-dimensional ray sensor to map an environment.

FIG. 19 is a simplified block diagram of an illustrative computer system 1900 such as a wearable device with which the present use of a one-dimensional ray sensor to map an environment may be implemented. Although a wearable device is discussed herein, other computing devices configured with a depth sensor (FIG. 2) and the configurations discussed herein may also be used, including smartphones, tablet computing devices, personal computers (PCs), laptops, etc. Computer system 1900 includes a processor 1905, a system memory 1911, and a system bus 1914 that couples various system components including the system memory 1911 to the processor 1905. The system bus 1914 may be any of several types of bus structures including a memory bus or memory controller, a peripheral bus, or a local bus using any of a variety of bus architectures. The system memory 1911 includes read only memory (ROM) 1917 and random access memory (RAM) 1921. A basic input/output system (BIOS) 1925, containing the basic routines that help to transfer information between elements within the computer system 1900, such as during startup, is stored in ROM 1917. The computer system 1900 may further include a hard disk drive 1928 for reading from and writing to an internally disposed hard disk (not shown), a magnetic disk drive 1930 for reading from or writing to a removable magnetic disk 1933 (e.g., a floppy disk), and an optical disk drive 1938 for reading from or writing to a removable optical disk 1943 such as a CD (compact disc), DVD (digital versatile disc), or other optical media. The hard disk drive 1928, magnetic disk drive 1930, and optical disk drive 1938 are connected to the system bus 1914 by a hard disk drive interface 1946, a magnetic disk drive interface 1949, and an optical drive interface 1952, respectively. The drives and their associated computer-readable storage media provide non-volatile storage of computer-readable instructions, data structures, program modules, and other data for the computer system 1900. Although this illustrative example includes a hard disk, a removable magnetic disk 1933, and a removable optical disk 1943, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present use of a one-dimensional ray sensor to map an environment. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are non-transitory and do not include waves, signals, and/or other transitory and/or intangible communication media.

A number of program modules may be stored on the hard disk, magnetic disk, optical disk, ROM 1917, or RAM 1921, including an operating system 1955, one or more application programs 1957, other program modules 1960, and program data 1963. A user may enter commands and information into the computer system 1900 through input devices such as a keyboard 1966 and pointing device 1968 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1905 through a serial port interface 1971 that is coupled to the system bus 1914, but may be connected by other interfaces, such as a parallel port, game port, or universal serial bus (USB). A monitor 1973 or other type of display device is also connected to the system bus 1914 via an interface, such as a video adapter 1975. In addition to the monitor 1973, wearable devices and personal computers can typically include other peripheral output devices (not shown), such as speakers and printers. The illustrative example shown in FIG. 19 also includes a host adapter 1978, a Small Computer System Interface (SCSI) bus 1983, and an external storage device 1976 connected to the SCSI bus 1983.

The computer system 1900 is operable in a networked environment using logical connections to one or more remote computers, such as a remote computer 1988. The remote computer 1988 may be selected as a personal computer, a server, a router, a network PC, a peer device, or other common network node, and typically includes many or all of the elements described above relative to the computer system 1900, although only a single representative remote memory/storage device 1990 is shown in FIG. 19. The logical connections depicted in FIG. 19 include a local area network (LAN) 1993 and a wide area network (WAN) 1995. Such networking environments are often deployed, for example, in offices, enterprise-wide computer networks, intranets, and the Internet.

When used in a LAN networking environment, the computer system 1900 is connected to the local area network 1993 through a network interface or adapter 1996. When used in a WAN networking environment, the computer system 1900 typically includes a broadband modem 1998, network gateway, or other means for establishing communications over the wide area network 1995, such as the Internet. The broadband modem 1998, which may be internal or external, is connected to the system bus 1914 via a serial port interface 1971. In a networked environment, program modules related to the computer system 1900, or portions thereof, may be stored in the remote memory storage device 1990. It is noted that the network connections shown in FIG. 19 are illustrative and other means of establishing a communications link between the computers may be used depending on the specific requirements of an application of the present use of a one-dimensional ray sensor to map an environment.

Various exemplary embodiments of the present using a one-dimensional ray sensor to map an environment are now presented by way of illustration and not as an exhaustive list of all embodiments. An example includes a wearable device, comprising: one or more processors; a single axis depth sensor affixed in a fixed position to the wearable device configured to passively scan and generate one-dimensional depth data for a physical environment; and memory having computer-readable instructions which, when executed by the one or more processors, cause the wearable device to: identify a location for the wearable device; receive original depth data from the depth sensor; develop a negative space blueprint for the physical environment at the identified location using the original depth data, the blueprint being based on points collected by the depth sensor; and update the blueprint of the physical environment as the depth sensor collects new depth data, in which pre-existing points from the original depth data are updated using the new depth data and undiscovered points of the physical environment are stored using the new depth data.

In another example, the instructions further cause the wearable device to: assign timestamps to points relative to being collected by the wearable device; when a point is not timely verified, initiate a decay process in which the unverified point is deleted from the blueprint; and when a point is timely verified, maintain the point within the blueprint. In another example, points are assigned a pre-set lifetime that runs based on the assignment of the timestamp, and the decay process for the points initiate when the points are not verified before expiration of the pre-set lifetime. In another example, points are verified when collected within the new depth data. In another example, the instructions further cause the wearable device to assign confidence values to points within the blueprint, the confidence values indicating a greater likelihood that a point is negative space and not a temporary object. In another example, the instructions further cause the wearable device to: use a reliability counter for each point; and increase the reliability counter when coordinates for a point identified in the new depth data correspond to coordinates for a pre-existing point from the original depth data, in which the confidence value for points increases relative to increases to the counter.

A further example includes a method performed by a wearable device or a computing device in communication with the wearable device over a network: identifying a location associated with the wearable device; determining an orientation associated with the wearable device; collecting points from a one-dimensional ray sensor affixed to the wearable device, in which the sensor continually picks up points as the wearable device navigates an area; and using the collected points and the location and orientation information, building a map of an area surrounding the wearable device, in which the map distinguishes between objects and permanent structures such that permanent structures are included in the map and objects are discarded.

In another example, permanent structures include walls, ceilings, floors, or support beams. In another example, objects that are discarded are movable or temporary objects within the area. In another example, the method further comprises replacing an original point within a point cloud image when subsequent point data indicates that the original point represented a temporary object. In another example, the method further comprises not replacing an original point within a point cloud image when subsequent point data represents a temporary object. In another example, the method further comprises reducing functionality of one or more components on the wearable device when the area in the map associated with the wearable device's current location is sufficiently developed beyond a threshold. In another example, reducing functionality includes switching off or disabling functions or components on the wearable device. In another example, the one or more components include any one or more of a processor, radio transmitter, Global Positioning System (GPS), or sensor.

A further example includes one or more hardware-based computer-readable memory devices storing instructions which, when executed by one or more processors disposed in a computing device, cause the computing device to: periodically receive point data directly or indirectly from a depth sensor; timestamp each point or group of points in the point data; build a map of negative space representing non-transient structures using the point data; discard the point data which represents transient structures; and update the map or a point cloud structure as point data is periodically received at temporally different times, in which updating the map or the point cloud structure includes at least one of: i) increasing a count associated with a point when the point in subsequent point data corresponds to a point in previous point data; and ii) replacing a point in previous point data with a point in subsequent point data.

In another example, the instructions further cause the computing device to: compare portions of the built map with an external map of the area; and re-index portions of the external map based on known content within the built map. In another example, temporally different times signify that the computing device was removed from a defined physical environment, and the computing device is subsequently present within the defined physical environment. In another example, the map is built using the point data and a known location and pose of the depth sensor receiving the point data. In another example, at least one of the location or pose is determined remotely from a computing device connected to the depth sensor. In another example, when the map is developed beyond a threshold percentage, the instructions further cause the computing device to disable components and enter the computing device into a low-power state.

The subject matter described above is provided by way of illustration only and is not to be construed as limiting. Various modifications and changes may be made to the subject matter described herein without following the example embodiments and applications illustrated and described, and without departing from the true spirit and scope of the present invention, which is set forth in the following claims.

What is claimed:

1. A wearable computing device that is not hand operated by a user, comprising:
    one or more processors;
    a single axis depth sensor affixed in a fixed position to the wearable computing device configured to passively scan and generate one-dimensional depth data for a physical environment in which the passive scanning is performed without explicit user interaction with the wearable computing device; and
    memory storing computer-readable instructions which, when executed by the one or more processors, cause the wearable computing device to:
        identify a location for the wearable computing device;
        operate the depth sensor to generate original depth data from the depth sensor for points in the physical environment;
        set a lifetime for each of the original depth data points;
        develop a negative space blueprint for the physical environment around the identified location using the original depth data for the points in the physical environment;
        operate the depth sensor to generate new depth data from the depth sensor for points in the physical environment;
        update the blueprint of the physical environment, in which pre-existing points from the original depth data are updated using the new depth data and in which new depth data for previously undiscovered points in the physical environment are stored;
        verify pre-existing points in the original depth data using points from the new depth data; and
        responsive to a pre-existing point in the original depth data not being verified within its lifetime by a series of scans, initiate a decay process in which the unverified point is deleted from the blueprint.

2. The wearable computing device of claim 1, in which the instructions further cause the wearable computing device to:
    assign timestamps to points relative to being collected by the wearable computing device; and
    when a point is timely verified, maintain the point within the blueprint.

3. The wearable computing device of claim 2, in which points are assigned a pre-set lifetime that runs based on the assignment of the timestamp, and the decay process for the points initiate when the points are not verified before expiration of the pre-set lifetime.

4. The wearable computing device of claim 1, in which the instructions further cause the wearable computing device to assign confidence values to points within the blueprint, the confidence values being utilized as a metric by which to indicate a likelihood that a point is negative space and not a temporary object.

5. The wearable computing device of claim 4, in which the instructions further cause the wearable computing device to:
    use a reliability counter for each point; and
    increase the reliability counter when coordinates for a point identified in the new depth data correspond to coordinates for a pre-existing point from the original depth data,
    in which the confidence value for points increases relative to increases to the counter.

6. A method for map building performed by a wearable computing device or a computing device in communication with the wearable computing device over a network, comprising:
    periodically operating a one-dimensional ray sensor that is fixedly attached to the wearable computing device so that depth data points for negative spaces in an area are passively collected without explicit user interaction during each period of operation;
    collecting the depth data points from a one-dimensional ray sensor using a plurality of successive scans in one or more periods of operation as the wearable computing device user navigates through the area;
    setting a lifetime for each of the collected depth data points;

identifying depth data points that are newly detected between the successive scans;

discarding depth data points that are not verified by one or more successive scans within their lifetime;

using the newly detected data points to identify transitory objects in the area that are discarded from the map building;

using the non-discarded collected depth data points and the location and orientation information, building a map of the negative spaces in the area that does not include the identified transitory objects;

determining whether the map of the area is developed beyond a threshold level; and responsive to the determination that the map of the area is developed beyond the threshold level, discontinuing operation of the one-dimensional ray sensor on the wearable computing device for the area.

7. The method of claim 6, in which the area contains permanent structures that include one or more of walls, ceilings, floors, or support beams.

8. The method of claim 6, in which objects that are discarded are movable or temporary objects within the area.

9. The method of claim 6, further comprising replacing an original point within a point cloud image when subsequent point data indicates that the original point represented a temporary object.

10. The method of claim 6, further comprising not replacing an original point within a point cloud image when subsequent point data represents a temporary object.

11. The method of claim 6, further comprising reducing functionality including switching off or disabling functions or components on the wearable computing device.

12. The method of claim 6, further comprising, responsive to the determination that the map of the area is developed beyond the threshold level, reducing functionality of one or more components including one or more of a processor, radio transmitter, Global Positioning System (GPS), or sensor.

13. One or more non-transitory hardware-based computer-readable memory devices storing instructions which, when executed by one or more processors disposed in a non-handheld wearable computing device, cause the computing device to:

periodically receive point data for a three-dimensional space from a single axis depth sensor in the non-handheld wearable computing device, in which the single axis depth sensor is periodically operated to scan the three-dimensional space to capture points of depth data without explicit user interaction with the wearable computing device using a plurality of successive scans;

generate timestamps for each point or group of points in the captured depth data;

using the timestamps, setting a lifetime for each point or group of points in the captured depth data;

associate data points that are not verified by one or more successive scans within their lifetime with transient structures;

build a map of negative space representing non-transient structures using the point data; and using the timestamps, update the map or a point cloud structure as point data is periodically received at temporally different times, in which updating includes:
   i) verifying a point when a point in subsequent point data corresponds to a point in previous point data; and
   ii) replacing a point in previous point data with a point in subsequent point data.

14. The one or more non-transitory hardware-based computer-readable memory devices of claim 13, in which the instructions further cause the computing device to:

compare portions of the built map with an external map of the area; and re-index portions of the external map based on known content within the built map.

15. The one or more non-transitory hardware-based computer-readable memory devices of claim 13, in which temporally different times signify that the computing device was removed from a defined physical environment, and the computing device is subsequently present within the defined physical environment.

16. The one or more non-transitory hardware-based computer-readable memory devices of claim 13, in which the map is built using the point data and a known location and pose of the depth sensor receiving the point data.

17. The one or more non-transitory hardware-based computer-readable memory devices of claim 16, in which at least one of the location or pose is determined remotely from a computing device connected to the depth sensor.

18. The one or more non-transitory hardware-based computer-readable memory devices of claim 13, in which, when the map is developed beyond a threshold percentage, the instructions further cause the computing device to disable components and enter the computing device into a low-power state.

* * * * *